(12) United States Patent
Fiess et al.

(10) Patent No.: US 9,383,575 B2
(45) Date of Patent: Jul. 5, 2016

(54) METHOD FOR ORIENTATING A GRID MIRROR AND GRID MIRROR DEVICE

(71) Applicant: Robert Bosch GmbH, Stuttgart (DE)

(72) Inventors: Reinhold Fiess, Durbach (DE); Frank Fischer, Gomaringen (DE); Gael Pilard, Wankheim (DE); Sebastion Reiss, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 82 days.

(21) Appl. No.: 14/397,121

(22) PCT Filed: Feb. 26, 2013

(86) PCT No.: PCT/EP2013/053781
§ 371 (c)(1),
(2) Date: Oct. 24, 2014

(87) PCT Pub. No.: WO2013/159953
PCT Pub. Date: Oct. 31, 2013

(65) Prior Publication Data
US 2015/0138517 A1 May 21, 2015

(51) Int. Cl.
*H04N 9/31* (2006.01)
*G02B 26/10* (2006.01)
(Continued)

(52) U.S. Cl.
CPC ............ *G02B 26/0816* (2013.01); *G02B 7/182* (2013.01); *G02B 7/1821* (2013.01); *G02B 7/1822* (2013.01); *G02B 7/1824* (2013.01); *G02B 7/1825* (2013.01); *G02B 7/1827* (2013.01); *G02B 26/101* (2013.01);
(Continued)

(58) Field of Classification Search
CPC .... G02B 7/182; G02B 7/1821; G02B 7/1822; G02B 7/1824; G02B 7/1825; G02B 7/1827; G02B 7/1828; G02B 7/198; G02B 26/0816; G02B 26/101; G02B 26/105; G02B 27/0031; G03B 21/2066; H04N 9/3129
See application file for complete search history.

(56) References Cited

U.S. PATENT DOCUMENTS 6,118,569 A * 9/2000 Plesko ................. G02B 7/1821
359/201.1
6,776,492 B1 * 8/2004 Chang .................. G02B 26/105
348/771

(Continued)

OTHER PUBLICATIONS

International Search Report for PCT/EP2013/053781, issued on Jun. 7, 2013.

*Primary Examiner* — Bao-Luan Le
(74) *Attorney, Agent, or Firm* — Norton Rose Fulbright US LLP

(57) ABSTRACT

A method is described for aligning a light beam, having the steps of: deflecting the light beam by way of a first mirror element and a second mirror element, the first mirror element being displaced through a first deflection angle around a first rotation axis, and the second mirror element being displaced through a second deflection angle around a second rotation axis inclined with respect to the first rotation axis, and the second mirror element being additionally displaced through a third deflection angle around a third rotation axis that is inclined with respect to the second rotation axis, and the first mirror element being displaced around a first mirror normal line of the first mirror element through a first compensation angle defined for the third deflection angle, and/or the second mirror element being displaced around a second mirror normal line of the second mirror element through a second compensation angle defined for the third deflection angle.

16 Claims, 5 Drawing Sheets

(51) Int. Cl.
*G02B 26/08* (2006.01)
*G02B 7/182* (2006.01)
*G02B 27/00* (2006.01)
*G03B 21/20* (2006.01)

(52) U.S. Cl.
CPC .......... *G02B26/105* (2013.01); *G02B 27/0031* (2013.01); *G03B 21/2066* (2013.01); *H04N 9/3129* (2013.01)

(56) References Cited

U.S. PATENT DOCUMENTS

| | | | | |
|---|---|---|---|---|
| 6,800,844 B2* | 10/2004 | Kandori | | G02B 26/101 250/234 |
| 6,937,372 B2* | 8/2005 | Kandori | | G02B 26/101 348/E9.026 |
| 6,945,652 B2* | 9/2005 | Sakata | | H04N 9/3129 348/201 |
| 6,972,737 B2* | 12/2005 | Furukawa | | H04N 9/3129 345/32 |
| 7,313,156 B2* | 12/2007 | Fujii | | H04N 9/3129 348/E9.026 |
| 7,369,287 B2* | 5/2008 | Tahk | | G02B 7/1821 359/196.1 |
| 7,385,745 B2* | 6/2008 | Ishihara | | G02B 26/101 348/E9.026 |
| 7,484,340 B2* | 2/2009 | Ishihara | | H04N 5/7458 353/20 |
| 7,512,160 B2* | 3/2009 | Fujii | | H04N 9/3129 372/21 |
| 7,809,032 B2* | 10/2010 | Fujii | | H04N 9/3129 372/29.016 |
| 7,982,934 B2* | 7/2011 | Champion | | H04N 9/3129 359/200.8 |
| 8,035,678 B2* | 10/2011 | Ishihara | | G02B 26/101 347/243 |
| 8,058,633 B2* | 11/2011 | Ikegami | | H04N 9/3129 250/552 |
| 8,199,180 B2* | 6/2012 | Nakaie | | B41J 2/45 347/241 |
| 8,226,239 B2* | 7/2012 | Ikegami | | H04N 9/3129 30/98 |
| 8,373,690 B2* | 2/2013 | Kurozuka | | G02B 26/101 345/204 |
| 8,459,799 B2* | 6/2013 | Wakabayashi | | G02B 26/101 348/195 |
| 8,641,195 B2* | 2/2014 | Wakabayashi | | G02B 26/101 353/28 |
| 2002/0196377 A1* | 12/2002 | Furukawa | | H04N 9/3129 348/742 |
| 2003/0011751 A1* | 1/2003 | Sakata | | H04N 9/3129 353/30 |
| 2003/0015652 A1* | 1/2003 | Kandori | | G02B 26/101 250/234 |
| 2003/0021497 A1* | 1/2003 | Kandori | | G02B 26/101 382/323 |
| 2005/0190419 A1* | 9/2005 | Ishihara | | G02B 26/101 359/202.1 |
| 2005/0265419 A1* | 12/2005 | Fujii | | H04N 9/3129 372/96 |
| 2006/0023165 A1* | 2/2006 | Ishihara | | H04N 9/3129 353/20 |
| 2006/0044297 A1* | 3/2006 | Furukawa | | H04N 9/3129 345/204 |
| 2006/0081774 A1* | 4/2006 | Tahk | | G02B 7/1821 250/234 |
| 2007/0171497 A1 | 7/2007 | Ishihara et al. | | |
| 2008/0002745 A1* | 1/2008 | Fujii | | H01S 5/06256 372/20 |
| 2008/0049095 A1* | 2/2008 | Ishihara | | G02B 26/101 347/247 |
| 2009/0141193 A1* | 6/2009 | Nakayama | | H04N 9/3129 348/751 |
| 2009/0213886 A1* | 8/2009 | Fujii | | H01S 5/06256 372/38.07 |
| 2009/0310633 A1* | 12/2009 | Ikegami | | H04N 9/3129 372/26 |
| 2010/0118371 A1* | 5/2010 | Lee | | G02B 7/1821 359/221.2 |
| 2010/0177285 A1* | 7/2010 | Sakakibara | | G02B 26/101 353/85 |
| 2011/0058108 A1* | 3/2011 | Champion | | H04N 9/3129 348/744 |
| 2011/0115870 A1* | 5/2011 | Nakaie | | B41J 2/45 347/224 |
| 2011/0116054 A1* | 5/2011 | Wakabayashi | | G02B 26/101 353/36 |
| 2011/0122101 A1* | 5/2011 | Kurozuka | | G02B 26/101 345/204 |
| 2011/0128312 A1* | 6/2011 | Ikegami | | H04N 9/3129 345/691 |
| 2011/0170156 A1* | 7/2011 | Takayama | | G02B 26/105 359/213.1 |
| 2011/0205497 A1* | 8/2011 | Wakabayashi | | G02B 26/101 353/28 |
| 2011/0297655 A1* | 12/2011 | Ueda | | G02B 26/121 219/121.67 |
| 2011/0317130 A1 | 12/2011 | Gollier | | |
| 2012/0013852 A1* | 1/2012 | Champion | | G02B 26/101 353/31 |

\* cited by examiner

METHOD FOR ORIENTATING A GRID MIRROR AND GRID MIRROR DEVICE

FIELD OF THE INVENTION

The invention relates to a method for aligning a light beam. The invention further relates to a mirror apparatus.

BACKGROUND INFORMATION

FIG. 1 schematically depicts a conventional mirror device.

The conventional mirror device depicted in FIG. 1 has a first mirror element 12 embodied displaceably around a first rotation axis 10, and a second mirror element 16 embodied displaceably around a second rotation axis 14. Second rotation axis 14 is aligned perpendicularly to first rotation axis 10. The two mirror elements 12 and 16 are disposed with respect to one another in such a way that a light beam 18 deflected by first mirror element 12 strikes second mirror element 16. By way of the two mirror elements 12 and 16, light beam 18 is intended to be alignable onto a light impingement surface 20 in such a way that, for example, an image can be projected.

SUMMARY

The invention creates a method for aligning a light beam, a method for projecting an image, a mirror apparatus, a mobile telephone, and a personal digital assistant device.

The present invention makes possible diversion or deflection or tilting of a light beam, reflected at the two mirror elements, through the third deflection angle (in addition to the deflection of the light beam through the first deflection angle and the second deflection angle), an improved alignment accuracy or target accuracy upon alignment of the reflected light beam onto a preferred impingement point simultaneously being achievable by way of the implemented displacement of the first mirror element through the first compensation angle and/or of the second mirror element through the second compensation angle. This advantage can also be restated as being that a distortion or deformation of a scanned surface and/or of a projected image can be reduced by way of the implemented displacement of the first mirror element through the first compensation angle and/or of the second mirror element through the second compensation angle.

For example, by way of the additional deflection of the reflected light beam through the third deflection angle, it is possible prevent an image, projected by way of the present invention, from partly impinging or being incident upon a support surface of the mirror apparatus used for projection. Deflection of the light beam through the third deflection angle as a result of the additional displacement of the second mirror element around the third rotation axis can thus contribute to a more complete projected image for a viewer. At the same time, better resolution or image sharpness can be ensured by way of the additional displacement of the first mirror element through the first compensation angle and/or of the second mirror element through the second compensation angle. The present invention thus contributes advantageously to a projected image that can be better perceived by a viewer.

Advantageous embodiments of the present invention are described by way of example in the dependent claims.

DETAILED DESCRIPTION

FIGS. 2a to 2f schematically depict mirror elements, projected light spots, and coordinate systems in order to explain a first embodiment of the method for aligning a light beam.

Figure 1:
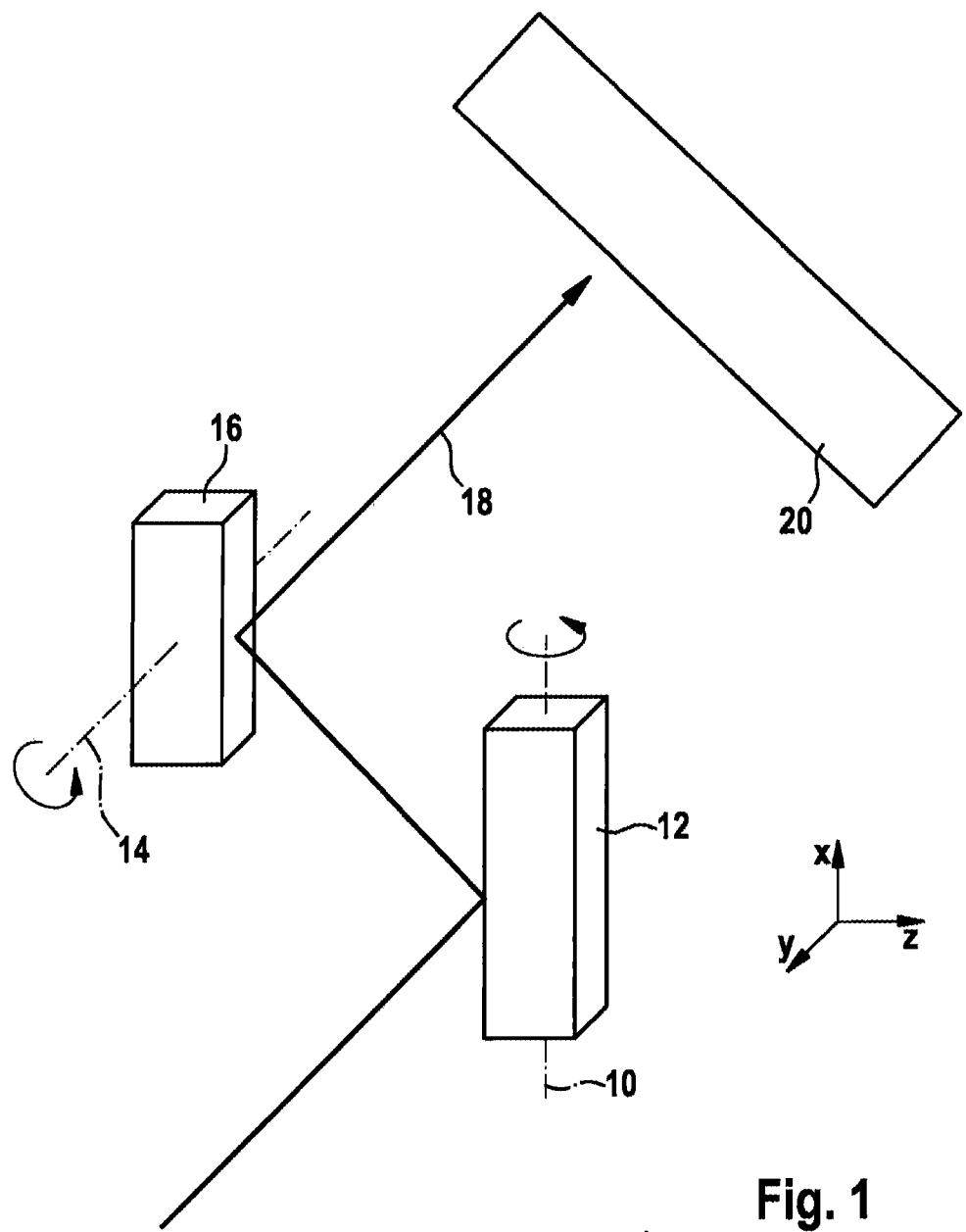
FIG. 1 schematically depicts a conventional mirror device.
Figure 2A:
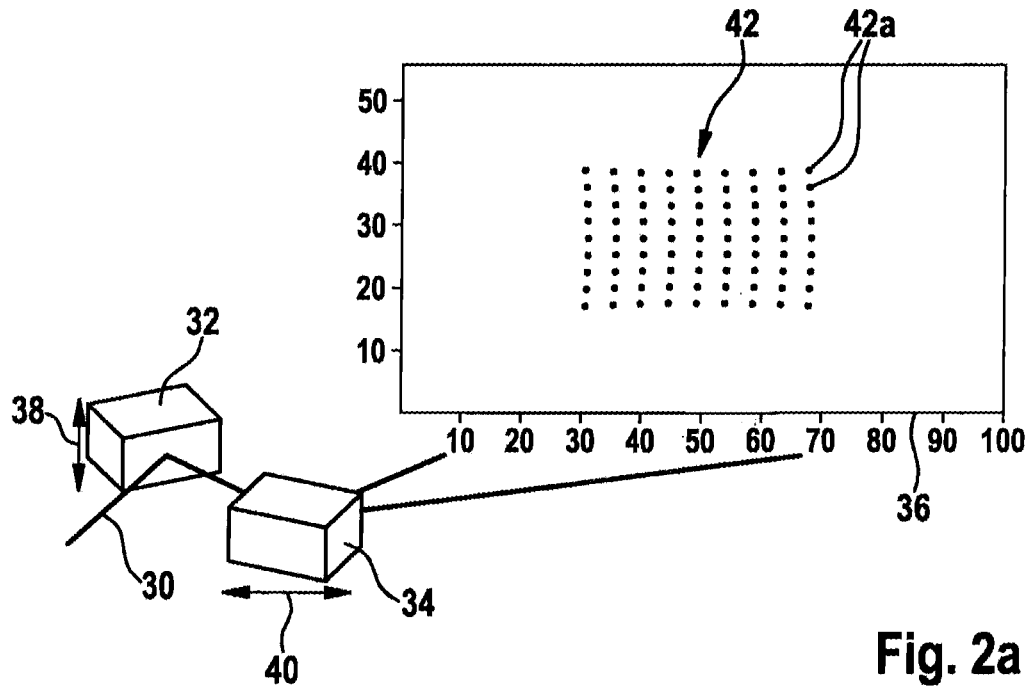
FIGS. 2a to 2f schematically depict mirror elements, projected light spots, and coordinate systems in order to explain a first embodiment of the method for aligning a light beam.

FIG. 2a schematically reproduces a first method step of the method for aligning a light beam. A light beam 30, e.g. a laser beam, is deflected by way of a first mirror element 32 and a second mirror element 34. First mirror element 32 and second mirror element 34 are aligned with respect to one another in such a way that a reflection of first mirror element 32 is incident onto second mirror element 34, in particular onto a reflective surface of second mirror element 34. The method described here is not limited, however, to this kind of mutual alignment of the two mirror elements 32 and 34. The two mirror elements 32 and 34 can also be aligned with respect to one another in such a way that a reflection of second mirror element 34 is incident into first mirror element 32, in particular onto a reflective surface of first mirror element 32.

Light beam 30 deflected by way of the two mirror elements 32 and 34 is aligned onto a light impingement surface 36. In particular, in the method a surface of light impingement surface 36 is scanned by light beam 30. In the context of scanning of at least a partial surface of light impingement surface 36, first mirror element 32 is displaced (through at least a first deflection angle not equal to zero) around a first rotation axis 38, and second mirror element 34 is displaced (through at least a second deflection angle not equal to zero) around a second rotation axis 40. Values from a value range having a defined successive increment can be established for the first deflection angle and/or the second deflection angle. Second rotation axis 40 is aligned at an inclination with respect to first rotation axis 38. Preferably second rotation axis 40 is directed perpendicularly to first rotation axis 38. In particular, first rotation axis 38 can be the horizontal axis (in order to generate a vertical deflection) and second rotation axis 40 can be the vertical axis (for a horizontal deflection). The implementability of the method described hereinafter is not limited, however, to such a definition of the two rotation axes 38 and 40.

FIG. 2a also shows a virtual (hypothetical) image 42, made up of spots or light spots 42a, that would be produced on light impingement surface 36 if only the method step so far described were implemented.

Figure 2B:
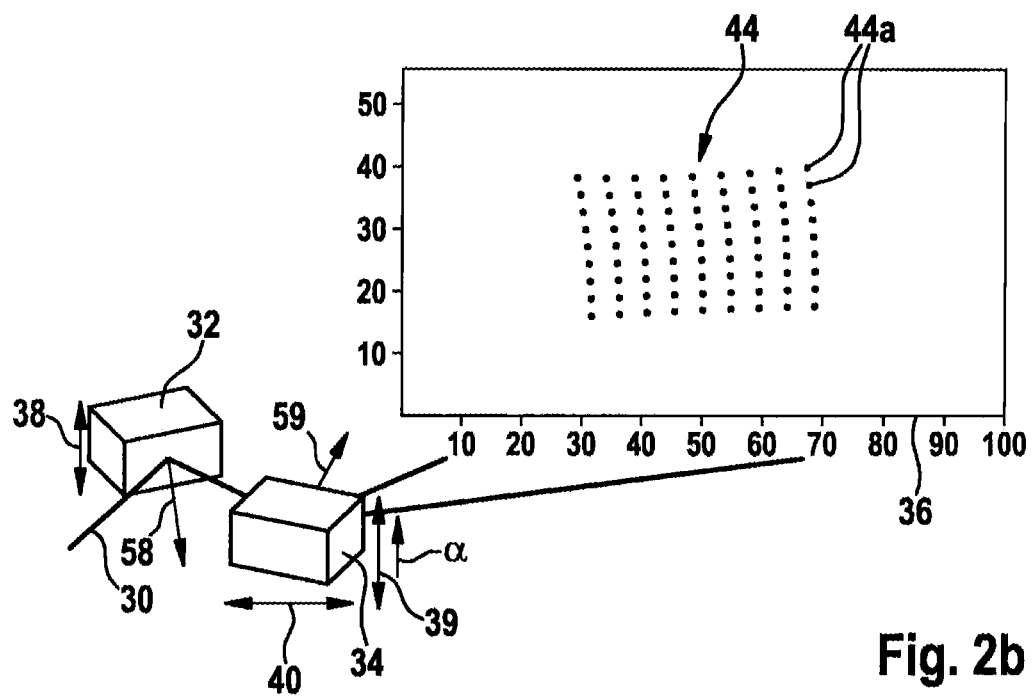

FIG. 2b shows a further method step that is implemented during a displacement of first mirror element 32 (through the first deflection angle not equal to zero) around first rotation axis 38, and of second mirror element 34 (through the second deflection angle not equal to zero) around second rotation axis 40. Here second mirror element 34 is additionally displaced through a third deflection angle α (not equal to zero) around a third rotation axis 39 that is aligned with an inclination with respect to second rotation axis 40. Third rotation axis 39 can in particular be aligned parallel to first rotation axis 38. The implementability of the method described hereinafter is not limited, however, to a parallel alignment of third rotation axis 39 with respect to first rotation axis 38. As a result of the additional displacement of second mirror element 34 through the third deflection angle α (not equal to zero), a tilting or swiveling of the surface scanned by way of the aligned light beam 30, and/or of the image projected by way of the aligned light beam 30, can be brought about.

Mirror elements 32 and 34 are, for example, often disposed in a housing that rests on a support surface. The housing can, in particular, have comparatively small dimensions. A housing of this kind is often disposed or placed on a support surface whose dimensions are relatively large as compared with the size of the housing. Conventionally, this sometimes causes the light beam 30 aligned by way of mirror elements 32 to 34 to be incident at least at times onto the support surface and not onto the desired light impingement surface 36. For example, the housing can be a mobile telephone housing or a housing of a (portable) personal digital assistant device (mobile assistant, PDA). The result of placing a mobile telephone or a (portable) personal digital assistant device on a table is often, conventionally, that the projected image is incident at least partly onto the table surface.

As a result of the additional displacement of second mirror element 34 through the third deflection angle α, a tilting of the scanned surface or of the projected image can be implemented by way of the method described here in such a way that the aligned light beam 30 is aligned via the support surface (not depicted) (of mirror elements 32 and 34) and thus strikes the desired light impingement surface 36, for example a wall or a screen. As a result of the additional displacement of second mirror element 34 through the third deflection angle α (not equal to zero), second mirror element 34 can be used to tilt the scanned surface or the projected image. This eliminates the need to displace first mirror element 32 additionally through the third deflection angle α around the first rotation axis 38 or around the third rotation axis 39, which would result in a further deflection of the light impingement point of the reflection of first mirror element 32 on second mirror element 34. The advantageous tilting of the scanned surface or of the projected image can therefore also be implemented without requiring, for that purpose, that the reflective surface of second mirror element 34 be enlarged.

FIG. 2b also shows a virtual (hypothetical) image 44, made up of spots or light spots 44a, that would be produced if only the method steps hitherto described are implemented. It is evident that the tilting can result in a deformation of the scanned surface or of the projected image. This deformation can, however, be compensated for or corrected at least in part by way of the method step described below.

Figure 2C:
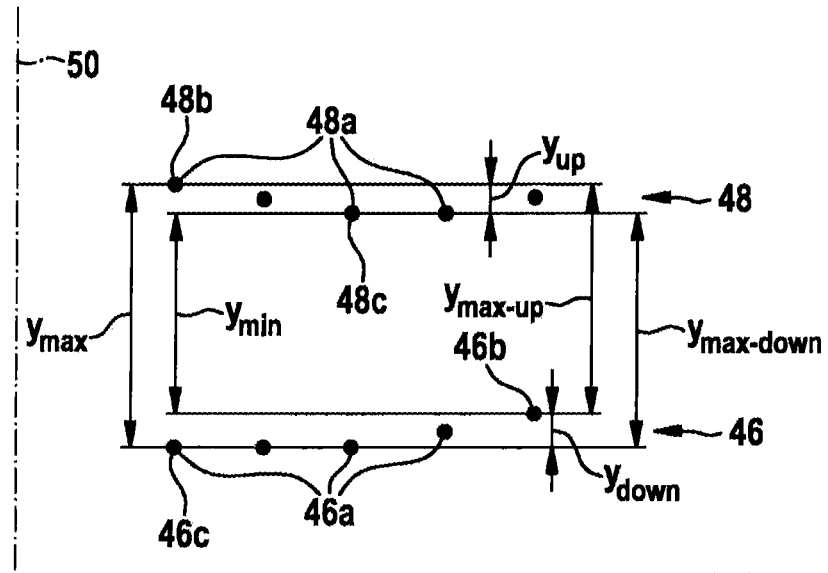

As depicted with reference to FIGS. 2c and 3d, the deformation of an image projected by way of the method for aligning a light beam can be described by a vertical deformation $D_{vert}$ and a horizontal deformation $D_{hor}$.

FIG. 2c shows two adjacent and horizontally aligned lines 46 and 48 as a portion of the image projected by way of the method for aligning a light beam. The vertical deformation $D_{vert}$ is defined according to equation (Eq 1) as:

$$D_{vert} = (y_{max} - y_{min})/y_{max}, \quad (Eq\ 1)$$

where $y_{max}$ is a maximum distance component in a vertical spatial direction of spots or light spots or impingement spots 46a of first horizontally aligned line 46 from spots or light spots or impingement spots 48a of second horizontally aligned line 48, and $y_{min}$ is a minimum distance component in a vertical spatial direction of spots or light spots or impingement spots 46a of first horizontally aligned line 46 from spots or light spots or impingement spots 48a of second horizontally aligned line 48. The "maximum distance component $y_{max}$ in a vertical spatial direction" and/or the "minimum distance component $y_{min}$ in a vertical spatial direction" are preferably each to be understood as a distance component aligned parallel to the vertical axis or gravitational axis 50 (e.g. a distance vector between a spot or light spot 46a and a spot or light spot 48a). (The vertical axis or gravitational axis 50 can be aligned, in particular, parallel to first rotation axis 38 or to second rotation axis 40.)

The deformation of the image projected by way of the method for aligning a light beam can also be paraphrased as an upwardly directed vertical deformation $D_{vert-up}$ and/or as a downwardly directed vertical deformation $D_{vert-down}$. If second horizontally aligned line 48 is located above first horizontally aligned line 46, the upwardly directed vertical deformation $D_{vert-up}$ can be rewritten according to equation (Eq 2) as:

$$D_{vert-up} = y_{up}/y_{max-up}, \quad (Eq\ 2)$$

where $y_{max-up}$ is a maximum distance component in a vertical spatial direction (parallel to vertical axis or gravitational axis 50) of highest point 46b of the first horizontally aligned line from highest point 48b of second horizontally aligned line 48, and $y_{up}$ is a variance in a vertical spatial direction (parallel to vertical axis or gravitational axis 50) of points 48a of the second horizontally aligned line.

The downwardly directed vertical deformation $D_{vert-down}$ can likewise be defined according to equation (Eq 3) as:

$$D_{vert-down} = y_{down}/y_{max-down}, \quad (Eq\ 3)$$

where $y_{max-down}$ is a distance component in a vertical spatial direction (parallel to vertical axis or gravitational axis 50) of lowest point 46c of first horizontally aligned line 46 from lowest point 48c of second horizontally aligned line 48, and $y_{down}$ is a variance in a vertical spatial direction (parallel to vertical axis or gravitational axis 50) of points 46a of first horizontally aligned line 46.

Figure 2D:
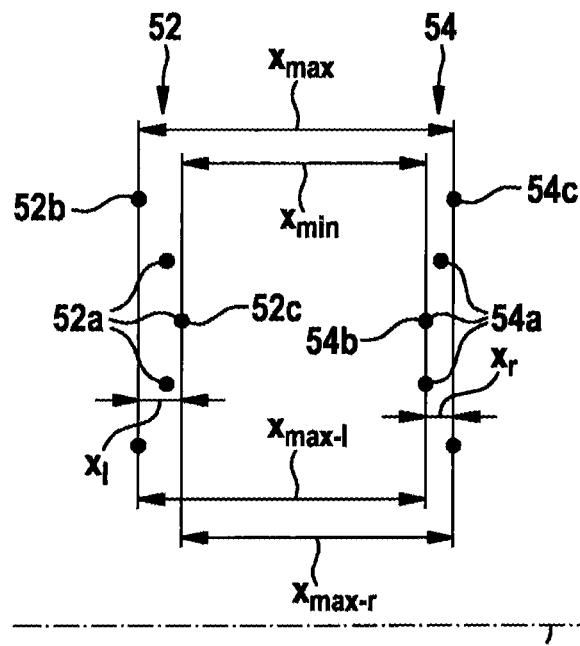

FIG. 2d shows two adjacent and vertically aligned lines 52 and 54 of the image projected by way of the method for aligning a light beam. Horizontal axis 56 is likewise plotted in FIG. 2d. The horizontal deformation $D_{hor}$ is defined according to equation (Eq 4) as:

$$D_{hor} = (x_{max} - x_{min})/x_{max}, \quad (Eq\ 4)$$

where $x_{max}$ is a maximum distance component in a horizontal spatial direction of spots or light spots or impingement spots 52a of first vertically aligned line 52 from spots or light spots or impingement spots 54a of second vertically aligned line 54, and $y_{min}$ is a minimum distance component in a horizontal spatial direction of spots or light spots 52a of first vertically aligned line 52 from spots or light spots 54a of second vertically aligned line 54. (The "maximum distance component $x_{max}$ in a horizontal spatial direction" and/or the "minimum distance component $x_{min}$ in a horizontal spatial direction" are preferably each to be understood respectively as a distance component aligned parallel to the horizontal axis 56 of a distance vector between a spot or light spot 52a and a spot or light spot 54a. Horizontal axis 56 can be aligned, in particular, parallel to first rotation axis 38 or to second rotation axis 40.)

The deformation of the image projected by way of the method for aligning a light beam can likewise be paraphrased as a leftwardly directed horizontal deformation $D_{hor-l}$ and/or as a rightwardly directed horizontal deformation $D_{hor-r}$. If second vertically aligned line 54 is located to the right of first vertically aligned line 52, the leftwardly directed horizontal deformation $D_{hor-l}$ can be paraphrased according to equation (Eq 5) as:

$$D_{hor-l} = x_l/x_{max-l}, \quad (Eq\ 5)$$

where $x_{max-l}$ is a maximum distance component in a horizontal spatial direction (parallel to horizontal axis 56) of leftmost projected point 52b of first vertically aligned line 52 from rightmost projected point 54b of second vertically aligned line 54, and $x_l$ is a variance in a horizontal spatial direction (parallel to horizontal axis 56) of points 52a of first vertically aligned line 52.

The rightwardly directed horizontal deformation $D_{hor-r}$ can likewise be defined according to equation (Eq 6) as:

$$D_{hor-r}=x_r/x_{max-r}, \quad (Eq\ 6)$$

where $x_{max-r}$ is a maximum distance component in a horizontal spatial direction (parallel to horizontal axis 56) of rightmost projected point 52c of first vertically aligned line 52 from rightmost projected point 54c of second vertically aligned line 54, and $x_r$ is a variance in a horizontal spatial direction (parallel to horizontal axis 56) of points 54a of second vertically aligned line 54.

In order to reduce a deformation of an image projected using the method described here, the method encompasses a further method step that is implemented, during a displacement of second mirror element 34 additionally through the third deflection angle α around third rotation axis 39. For this, first mirror element 32 is displaced around a first mirror normal line 58 of first mirror element 32 through a first compensation angle (not equal to zero) defined for the third deflection angle α, and/or second mirror element 34 is displaced around a second mirror normal line 59 of second mirror element 34 through a second compensation angle (not equal to zero) defined for the third deflection angle α. The "mirror normal line" 58 or 59 of a mirror element 32 or 34 can be understood in particular as an axis that is aligned perpendicular to a reflective light impingement surface of the respective mirror element 32 or 34.

As a result of the additional displacement of at least one mirror element 32 and 34 around the respective mirror normal line 58 or 59, a deformation brought about conventionally by the displacement of second mirror element 34 through the third deflection angle α can be at least partly corrected. An advantageous accuracy or resolution of the projected image can thus be ensured despite the tilting of the projected image.

Conventionally, an image deformation triggered by tilting of a projected image can significantly distort said image, in particular if the tilt occurs through a comparatively large third deflection angle α, since the deformation can be proportional to the third deflection angle α. A tilt through a comparatively large third deflection angle α is often necessary, however, for example in order to prevent an image projected using a micromirror apparatus placed on a table from being incident onto a tabletop. Image deformations having a vertical deformation $D_{vert}$ of up to 15% or more and a horizontal deformation $D_{hor}$ of up to 10% or more can thus conventionally occur. Using the method described here for aligning a light beam, however, large deformations of this kind can be reliably prevented even if second mirror element 34 is displaced through a comparatively large third deflection angle α.

The method described here for aligning a light beam furthermore offers reliable prevention of a vertical and/or horizontal deformation $D_{vert}$ and $D_{hor}$ without an electrical image correction or image compensation, in which, conventionally, reduction of the vertical and/or horizontal deformation $D_{vert}$ and $D_{hor}$ often requires the calculation of new first deflection angles and/or second deflection angles that are to be adapted to the third deflection angle α. An electrical image correction of this kind in accordance with the existing art often results, however, in degraded image resolution and in a decrease in the projectable image dimensions. This disadvantage does not occur with the method described here. Implementation of an electrical image correction moreover requires a comparatively complex electronic system having a relatively large memory capacity in order to recalculate the first deflection angle, the second deflection angle, and/or the pixel coordinates of the image to be projected. The method described here for aligning a light beam, conversely, can be carried out even using an electronic system that is inexpensive and requires little installation space.

In a preferred embodiment of the invention, first mirror element 32 is displaced (during the displacement of second mirror element 34 additionally through the third deflection angle α around third rotation axis 39) around first mirror normal line 58 of first mirror element 32 through the first compensation angle defined for the third deflection angle α. Second mirror element 34 is likewise displaced (almost) simultaneously around second mirror normal line 59 of second mirror element 34 through the second compensation angle provided for the third deflection angle α. This combined displacement of the two mirror elements 32 and 34 through the compensation angles respectively defined therefor can contribute to an advantageous rectification of the image projected using the method for deflecting a light beam. This ensures pleasant and clear viewing of the projected image for an observer thereof.

Upon implementation of the method, the first compensation angle and/or the second compensation angle can be predefined. The first compensation angle and second compensation angle can likewise be defined at least in consideration of the (presently established) third deflection angle α. This is advantageous provided different third deflection angle α are used in the method. In an advantageous refinement, the first compensation angle and/or the second compensation angle can also be stipulated additionally in consideration of the first deflection angle and/or of the second deflection angle.

The horizontal compensation angle, constituting a first compensation angle or second compensation angle, is preferably defined or stipulated in such a way that a vertical deformation $D_{vert}$, $D_{vert-down}$, and/or $D_{vert-up}$ of two adjacent and horizontally aligned lines 46 and 48 made up of spots or light spots 46a and 48a of the aligned light beam 30 on a light impingement surface 36 is reduced. As an alternative or supplement thereto, a vertical compensation angle, constituting a first compensation angle or second compensation angle, can also be defined or stipulated in such a way that a horizontal deformation $D_{hor}$, $D_{hor-r}$, and/or $D_{hor-l}$ of two adjacent and vertically aligned lines 52 and 54 made up of spots or light spots 52a and 54a of the aligned light beam 30 on a light impingement surface 36 is reduced or minimized. In particular, the vertical compensation angle and/or the horizontal compensation angle can be stipulated in such a way that at least one vertical deformation $D_{vert}$, $D_{vert-down}$, and/or $D_{vert-up}$ and/or at least one horizontal deformation $D_{hor}$, $D_{hor-r}$, and/or $D_{hor-l}$ reaches a minimum.

Combined displacement of the two mirror elements 32 and 34 around the respective mirror normal lines 58 and 59 can be implemented easily by displacing a holder of the two mirror elements 32 and 34, for example a projector module, with reference to its housing. This ensures rapid displacement of the two mirror elements 32 and 34 around the respective mirror normal lines 58 and 59.

Figure 2E:
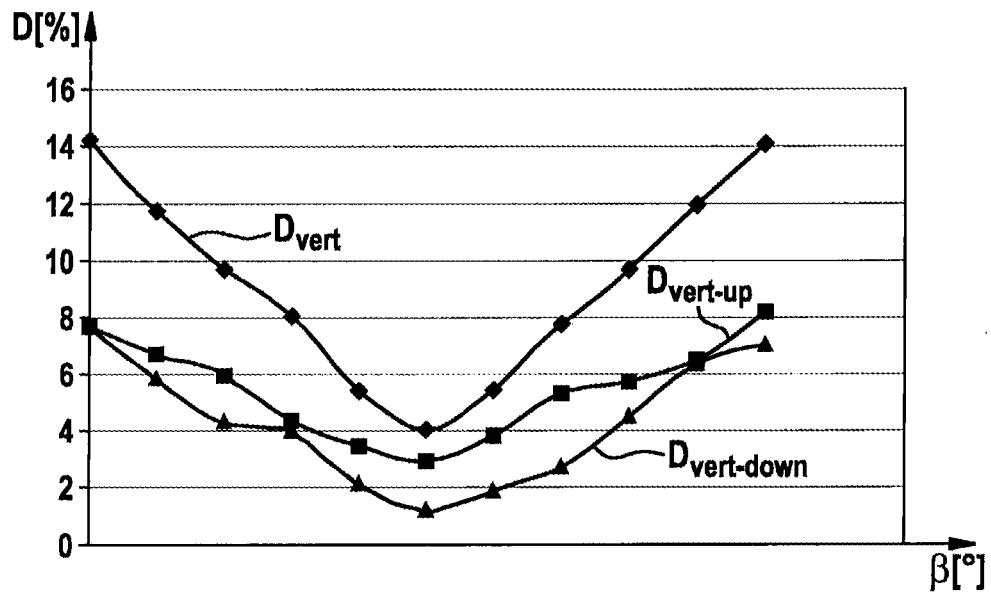
Figure 2F:
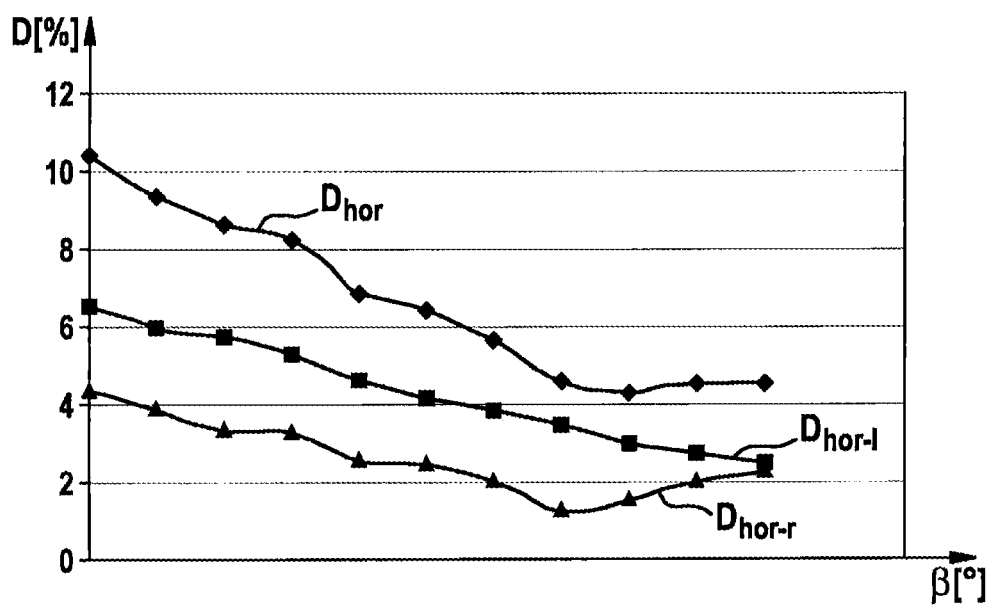

FIGS. 2e and 2f show two coordinate systems in order to explain a result of a method step of this kind. The abscissas of the coordinate systems of FIGS. 2e and 2f are the common compensation angle β (in degrees). The ordinates of the coordinate systems of FIGS. 2e and 2f, conversely, indicate deformation values D (as a percentage).

The vertical deformation $D_{vert}$, the upwardly directed vertical deformation $D_{vert-up}$, and the downwardly directed vertical deformation $D_{vert-down}$ are plotted in FIG. 2e. It is evident that the deformation values $D_{vert}$, $D_{vert-down}$, and $D_{vert-up}$ exhibit significant minima for a specific compensation angle β.

The horizontal deformation $D_{hor}$, the leftwardly directed vertical deformation $D_{hor-l}$, and the rightwardly directed horizontal deformation $D_{hor-r}$ are plotted in the coordinate system of FIG. 2f. It is evident that the deformation values $D_{hor}$, $D_{hor-r}$, and $D_{hor-l}$ decrease with increasing compensation angle β. For these deformation values as well, it is possible to stipulate a compensation angle β at which the deformation angles $D_{hor}$, $D_{hor-r}$, and $D_{hor-l}$ are comparatively small.

Figure 3A:
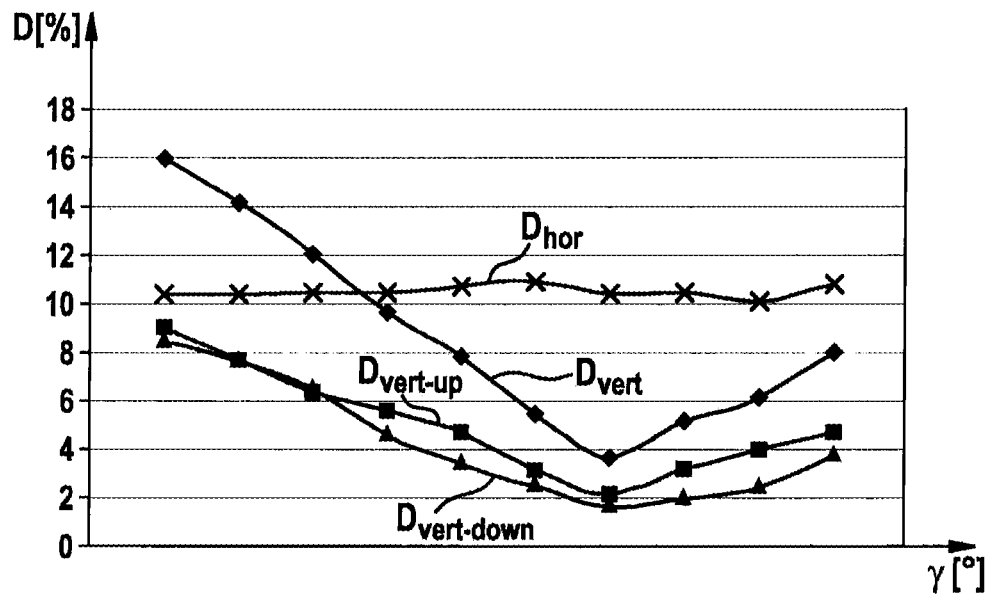
FIGS. 3a and 3b show two coordinate systems in order to explain a second embodiment of the method for aligning a light beam.
Figure 3B:
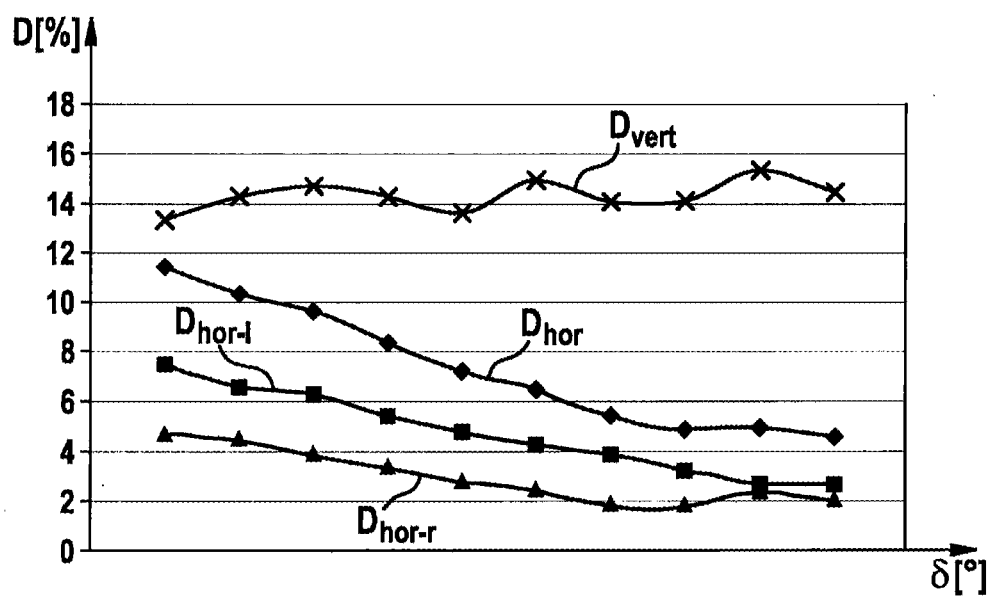

FIGS. 3a and 3b show two coordinate systems in order to explain a second embodiment of the method for aligning a light beam.

The method reproduced schematically with reference to FIGS. 3a and 3b has the method steps already described above. As a modification of the method described above, with the embodiment discussed here mirror elements 32 and 34 are displaced around the respective mirror normal lines 58 and 59 through different compensation angles γ and δ.

FIG. 3a shows the displacement of a mirror element 32 or 34 through a horizontal compensation angle γ constituting a first compensation angle or a second compensation angle. (The "horizontal compensation angle γ" is to be understood as the compensation angle of a mirror element 32 or 34 whose first or second rotation axis 38 or 40 is aligned horizontally, i.e. parallel to horizontal axis 56.) While the abscissa indicates the horizontal compensation angle γ (in degrees) the ordinate corresponds to the deformation values D (as a percentage). It is apparent here that the vertical deformation values $D_{vert}$, $D_{vert-down}$, and/or $D_{vert-up}$ can be adjusted, by displacement of the horizontal compensation angle γ, to a common minimum, while the horizontal deformation $D_{hor}$ remains (almost) constant even though the horizontal compensation angle γ is varied.

FIG. 3a reproduces the influences of an implemented vertical compensation angle δ constituting a first compensation angle or a second compensation angle. (The "vertical compensation angle δ" is the compensation angle of a mirror element 32 or 34 whose first or second rotation axis 38 or 40 is aligned vertically, parallel to the vertical axis or gravitation axis 50.) The abscissa indicates the vertical compensation angle δ (in degrees), while the ordinate indicates the deformation values D (as a percentage). As is apparent from FIG. 3b, the horizontal deformation values $D_{hor}$, $D_{hor-r}$, and/or $D_{hor-l}$ decrease with an increase in the vertical compensation angle δ, while the vertical deformation $D_{vert}$ remains (approximately) constant even though the vertical compensation angle δ is varied.

Individual displacement of mirror elements 32 and 34 through different compensation angles γ and δ is thus associated with the advantage that the vertical deformation $D_{vert}$, $D_{vert-down}$, and/or $D_{vert-up}$ and the horizontal deformation $D_{hor}$, $D_{hor-r}$, and/or $D_{hor-l}$ can be limited independently of one another by suitably stipulating various compensation angles γ and δ. The horizontal deformation $D_{hor}$, $D_{hor-r}$, and/or $D_{hor-l}$ can be reduced by the rotation of mirror element 32 or 34 for vertical scanning, i.e. having a vertically aligned rotation axis 38 or 40, while the vertical deformation $D_{vert}$, $D_{vert-down}$, and/or $D_{vert-up}$ can be adjusted to a comparatively low value by way of a rotation of mirror element 32 or 34 for horizontal scanning.

In addition, mechanisms for independent displacement of the two mirror elements 32 and 34 through different compensation angles γ and δ around the respective mirror normal lines 58 and 59 can often be of lighter and smaller configuration than a mechanism for combined displacement of a holder of the two mirror elements 32 and 34 with respect to the housing. A weight, a size, and/or an installation space requirement of the mirror apparatus used to implement the method can thus be reduced by implementing this embodiment.

The method for aligning a light beam is described in the paragraphs above with reference to a method for projecting an image made up of light spots. It is noted, however, that the implementability of the method is not limited to the projection of an image made up of light spots.

The embodiments described above of the method for aligning a light beam can be implemented using a mirror apparatus. A mirror apparatus of this kind preferably has a first mirror element displaceable around a first rotation axis, and a second mirror element displaceable around a second rotation axis inclined with respect to the first rotation axis, the first mirror element and the second mirror element being alignable with one another in such a way that a reflection of the first mirror element is incident onto the second mirror element, or a reflection of the second mirror element is incident onto the first mirror element. The second mirror element is furthermore additionally displaceable (during a displacement of the first mirror element through a first deflection angle around the first rotation axis and of the second mirror element through a second deflection angle around the second rotation axis) through a third deflection angle around a third rotation axis that is aligned with an inclination with respect to the second rotation axis. In addition, the first mirror element is displaceable around a first mirror normal line of the first mirror element through a first compensation angle defined for the third deflection angle, and/or the second mirror element is displaceable around a second mirror normal line of the second mirror element through a second compensation angle defined for the third deflection angle (during a displacement of the second mirror element additionally through the third deflection angle around the third rotation axis). (Because the important elements of the mirror apparatus have already been sketched in the Figures set forth above, a graphic depiction of the mirror apparatus is omitted.)

Preferably the first mirror element is displaceable around the first mirror normal line through the first compensation angle defined for the third deflection angle, and the second mirror element is displaceable around the second mirror normal line through the second compensation angle defined for the third deflection angle (during the displacement of the second mirror element additionally through the third deflection angle around the third rotation axis) in simultaneous or combined fashion. The implementability of the mirror apparatus is not limited, however, to this refinement.

The mirror apparatus preferably encompasses a control device with which the first compensation angle and/or the second compensation angle can be stipulated at least in consideration of the third deflection angle. In particular, the control device can be designed to stipulate the first compensation angle and/or the second compensation angle additionally in consideration of the first deflection angle and/or of the second deflection angle.

Advantageously, a horizontal compensation angle constituting a first compensation angle or constituting a second compensation angle is defined, or (by way of the control device) can be stipulated, in such a way that the (above-described) vertical deformation $D_{vert}$, $D_{vert-up}$, and/or $D_{vert-down}$ is reduced. As a supplement or alternative, a vertical compensation angle constituting a first compensation angle or constituting a second compensation angle can also be defined, or (by way of the control device) can be stipulated, in such a way that the (above-described) horizontal deformation $D_{hor}$, $D_{hor-l}$, and/or $D_{hor-r}$ is reduced.

The advantageous mirror apparatus can be designed in particular in such a way that one of the mirror elements has a smaller displacement range and is displaceable more slowly, for example at a frequency of approximately 60 Hz. The other mirror element can have a larger displacement range and can be displaceable more quickly. For example, the slower mirror element can be horizontally displaceable while the more quickly displaceable mirror element is vertically displaceable. The slower mirror element can also be vertically displaceable, while the faster mirror element is used for horizontal deflection of a light beam.

With the advantageous mirror apparatus, an image having in particular a vertical and/or horizontal deformation of less than 5% can be projected. It is noted that the reduction in deformation is not limited to a specific value.

Furthermore, in addition to the advantageous functions described here, an electronic correction method can be carried out in order to additionally reduce the deformation of the projected image. The advantageous functions described here can thus be combined with a plurality of conventional correction methods.

The mirror apparatus used to implement the above-described functions can be embodied in particular as a micromirror, as a projector, and/or as a scanner. The technology according to the present invention can thus be used for a plurality of different possible applications.

The advantageous mirror apparatus can be used in particular in a mobile telephone or in a (portable) personal digital assistant device (mobile assistant, PDA). Because such devices are often used having been placed onto a surface that is comparatively large with respect to their size, it is advantageous to have, by way of the above-described functions, the capability of projecting an image beyond the placement surface and at the same time of ensuring advantageous resolution of the projected image.

It is also noted that the advantageous mirror apparatus can be embodied with comparatively small dimensions. This facilitates use of the mirror apparatus in a mobile telephone or in a personal digital assistant device. The usability of the mirror apparatus is not limited, however, to mobile telephones or to personal digital assistant devices.

It is furthermore noted that the implementability of the method for aligning a light beam is not limited to the use of a specific mirror apparatus.

What is claimed is:

1. A method for aligning a light beam, comprising:
    deflecting the light beam by way of a first mirror element and a second mirror element, the first mirror element and the second mirror element being aligned with one another in such a way that one of:
        a reflection of the first mirror element is incident onto the second mirror element, and
        a reflection of the second mirror element is incident onto the first mirror element,
    wherein the first mirror element is displaced through a first deflection angle around a first rotation axis, wherein the second mirror element is displaced through a second deflection angle around a second rotation axis inclined with respect to the first rotation axis;
    during a displacement of the first mirror element through the first deflection angle around the first rotation axis and of the second mirror element through the second deflection angle around the second rotation axis, additionally displacing the second mirror element through a third deflection angle around a third rotation axis that is aligned with an inclination with respect to the second rotation axis; and
    during a displacement of the second mirror element additionally through the third deflection angle around the third rotation axis, at least one of:
        displacing the first mirror element around a first mirror normal line of the first mirror element through a first compensation angle defined for the third deflection angle, and
        displacing the second mirror element around a second mirror normal line of the second mirror element through a second compensation angle defined for the third deflection angle.

2. The method as recited in claim 1, further comprising:
    during the displacement of the second mirror element additionally through the third deflection angle around the third rotation axis:
        displacing the first mirror element around the first mirror normal line of the first mirror element through the first compensation angle defined for the third deflection angle, and
        displacing the second mirror element around the second mirror normal line of the second mirror element through the second compensation angle defined for the third deflection angle.

3. The method as recited in claim 1, wherein at least one of the first compensation angle and the second compensation angle is stipulated at least in consideration of the third deflection angle.

4. The method as recited in claim 3, wherein at least one of the first compensation angle and the second compensation angle is stipulated additionally in consideration of at least one of the first deflection angle and the second deflection angle.

5. The method as recited in claim 1, wherein a horizontal compensation angle corresponding to one of a first compensation angle and a second compensation angle is one of defined and stipulated in such a way that a vertical deformation $D_{vert}$ of two adjacent and horizontally aligned lines made up of light spots of the aligned light beam on a light impingement surface is reduced, the vertical deformation $D_{vert}$ being defined as $$D_{vert}=(y_{max}-y_{min})/y_{max},$$

where $y_{max}$ is a maximum distance component in a vertical spatial direction of the light spots of the first horizontally aligned line from the light spots of the second horizontally aligned line, and $y_{min}$ is a minimum distance component in a vertical spatial direction of the light spots of the first horizontally aligned line from the light spots of the second horizontally aligned line.

6. The method as recited in claim 1, wherein a vertical compensation angle corresponding to one of a first compensation angle and a second compensation angle is one of defined and stipulated in such a way that a horizontal deformation $D_{hor}$ of two adjacent and vertically aligned lines made up of light spots of the aligned light beam on a light impingement surface is reduced, the horizontal deformation $D_{hor}$ being defined as $$D_{hor}=(x_{max}-x_{min})/x_{max},$$

where $x_{max}$ is a maximum distance component in a horizontal spatial direction of the light spots of the first vertically aligned line from the light spots of the second vertically aligned line, and $x_{min}$ is a minimum distance component in a horizontal spatial direction of the light spots of the first vertically aligned line from the light spots of the second vertically aligned line.

7. A method for projecting an image, comprising:
aligning a light beam by:
deflecting the light beam by way of a first mirror element and a second mirror element, the first mirror element and the second mirror element being aligned with one another in such a way that one of:
a reflection of the first mirror element is incident onto the second mirror element, and
a reflection of the second mirror element is incident onto the first mirror element,
wherein the first mirror element is displaced through a first deflection angle around a first rotation axis, wherein the second mirror element is displaced through a second deflection angle around a second rotation axis inclined with respect to the first rotation axis;
during a displacement of the first mirror element through the first deflection angle around the first rotation axis and of the second mirror element through the second deflection angle around the second rotation axis, additionally displacing the second mirror element through a third deflection angle around a third rotation axis that is aligned with an inclination with respect to the second rotation axis; and
during a displacement of the second mirror element additionally through the third deflection angle around the third rotation axis, at least one of:
displacing the first mirror element around a first mirror normal line of the first mirror element through a first compensation angle defined for the third deflection angle, and
displacing the second mirror element around a second mirror normal line of the second mirror element through a second compensation angle defined for the third deflection angle.

8. A mirror apparatus, comprising:
a first mirror element displaceable around a first rotation axis; and
a second mirror element displaceable around a second rotation axis inclined with respect to the first rotation axis, wherein the first mirror element and the second mirror element are alignable with one another in such a way that one of:
a reflection of the first mirror element is incident onto the second mirror element, and
a reflection of the second mirror element is incident onto the first mirror element,
wherein during a displacement of the first mirror element through a first deflection angle around the first rotation axis and of the second mirror element through a second deflection angle around the second rotation axis, the second mirror element is additionally displaceable through a third deflection angle around a third rotation axis is aligned with an inclination with respect to the second rotation axis, and
wherein during a displacement of the second mirror element additionally through the third deflection angle around the third rotation axis, at least one of:
the first mirror element is displaceable around a first mirror normal line of the first mirror element through a first compensation angle defined for the third deflection angle, and
the second mirror element is displaceable around a second mirror normal line of the second mirror element through a second compensation angle defined for the third deflection angle.

9. The mirror apparatus as recited in claim 8, wherein during the displacement of the second mirror element additionally through the third deflection angle around the third rotation axis:
the first mirror element is displaceable around the first mirror normal line of the first mirror element through the first compensation angle defined for the third deflection angle, and
the second mirror element is displaceable around the second mirror normal line of the second mirror element through the second compensation angle defined for the third deflection angle.

10. The mirror apparatus as recited in claim 8, further comprising:
a control device with which at least one of the first compensation angle and the second compensation angle can be stipulated at least in consideration of the third deflection angle.

11. The mirror apparatus as recited in claim 10, wherein the control device stipulates at least one of the first compensation angle and the second compensation angle additionally in consideration of at least one of the first deflection angle and the second deflection angle.

12. The mirror apparatus as recited in claim 8, wherein a horizontal compensation angle corresponding to one of a first compensation angle and a second compensation angle is one of defined and capable of being stipulated in such a way that a vertical deformation $D_{vert}$ of two adjacent and horizontally aligned lines made up of light spots of the aligned light beam on a light impingement surface is reduced, the vertical deformation $D_{vert}$ being defined as $$D_{vert} = (y_{max} - y_{min})/y_{max},$$

where $y_{max}$ is a maximum distance component in a vertical spatial direction of the light spots of the first horizontally aligned line from the light spots of the second horizontally aligned line, and $y_{min}$ is a minimum distance component in a vertical spatial direction of the light spots of the first horizontally aligned line from the light spots of the second horizontally aligned line.

13. The mirror apparatus as recited in claim 8, wherein a vertical compensation angle corresponding to one of a first compensation angle and a second compensation angle is one of defined and capable of being stipulated in such a way that a horizontal deformation $D_{hor}$ of two adjacent and vertically aligned lines made up of light spots of the aligned light beam on a light impingement surface is reduced, the horizontal deformation $D_{hor}$ being defined as $$D_{hor} = (x_{max} - x_{min})/x_{max},$$

where $x_{max}$ is a maximum distance component in a horizontal spatial direction of the light spots of the first vertically aligned line from the light spots of the second vertically aligned line, and $x_{min}$ is a minimum distance component in a horizontal spatial direction of the light spots of the first vertically aligned line from the light spots of the second vertically aligned line.

14. The mirror apparatus as recited in claim 8, the mirror apparatus being embodied as at least one of a micromirror, a projector, and a scanner.

15. A mobile telephone, comprising:
  a mirror apparatus, including:
    a first mirror element displaceable around a first rotation axis; and
    a second mirror element displaceable around a second rotation axis inclined with respect to the first rotation axis, wherein the first mirror element and the second mirror element are alignable with one another in such a way that one of:
      a reflection of the first mirror element is incident onto the second mirror element, and
      a reflection of the second mirror element is incident onto the first mirror element,
    wherein during a displacement of the first mirror element through a first deflection angle around the first rotation axis and of the second mirror element through a second deflection angle around the second rotation axis, the second mirror element is additionally displaceable through a third deflection angle around a third rotation axis is aligned with an inclination with respect to the second rotation axis, and
    wherein during a displacement of the second mirror element additionally through the third deflection angle around the third rotation axis, at least one of:
      the first mirror element is displaceable around a first mirror normal line of the first mirror element through a first compensation angle defined for the third deflection angle, and
      the second mirror element is displaceable around a second mirror normal line of the second mirror element through a second compensation angle defined for the third deflection angle.

16. A personal digital assistant device, comprising:
  a mirror apparatus, including:
    a first mirror element displaceable around a first rotation axis; and
    a second mirror element displaceable around a second rotation axis inclined with respect to the first rotation axis, wherein the first mirror element and the second mirror element are alignable with one another in such a way that one of:
      a reflection of the first mirror element is incident onto the second mirror element, and
      a reflection of the second mirror element is incident onto the first mirror element,
    wherein during a displacement of the first mirror element through a first deflection angle around the first rotation axis and of the second mirror element through a second deflection angle around the second rotation axis, the second mirror element is additionally displaceable through a third deflection angle around a third rotation axis is aligned with an inclination with respect to the second rotation axis, and
    wherein during a displacement of the second mirror element additionally through the third deflection angle around the third rotation axis, at least one of:
      the first mirror element is displaceable around a first mirror normal line of the first mirror element through a first compensation angle defined for the third deflection angle, and
      the second mirror element is displaceable around a second mirror normal line of the second mirror element through a second compensation angle defined for the third deflection angle having a mirror apparatus.

* * * * *